United States Patent
Brodsky

(10) Patent No.: US 6,751,345 B2
(45) Date of Patent: Jun. 15, 2004

(54) METHOD AND APPARATUS FOR IMPROVING OBJECT BOUNDARIES EXTRACTED FROM STEREOSCOPIC IMAGES

(75) Inventor: Tomas Brodsky, Croton on Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 704 days.

(21) Appl. No.: 09/781,507

(22) Filed: Feb. 12, 2001

(65) Prior Publication Data

US 2002/0110272 A1 Aug. 15, 2002

(51) Int. Cl.[7] .................................................. G06K 9/00
(52) U.S. Cl. ...................................................... 382/154
(58) Field of Search ............................. 382/154; 345/419, 345/420, 421, 424; 348/42, 46, 51; 356/12

(56) References Cited

U.S. PATENT DOCUMENTS

| | | | |
|---|---|---|---|
| 5,202,928 A | | 4/1993 | Tomita et al. |
| 5,530,774 A | | 6/1996 | Fogel |
| 5,917,937 A | | 6/1999 | Szeliski et al. |
| 6,046,763 A | | 4/2000 | Roy |
| 6,075,557 A | * | 6/2000 | Holliman et al. ............. 348/51 |
| 6,701,005 B1 | * | 3/2004 | Nichani ...................... 382/154 |

FOREIGN PATENT DOCUMENTS

DE   195 09 373 C1   3/1995

OTHER PUBLICATIONS

Motion segmentation: A synergistic approach, by Fermuller et al. IEEE 1999, pp. 226–231.*

Birchfield et al.; Depth Discontinuities by Pixel–to–Pixel Stereo; Proceedings of the 1998 IEEE International Conference on Computer Vision; Bombay, India.

* cited by examiner

*Primary Examiner*—Vikkram Bali
(74) *Attorney, Agent, or Firm*—Gregory L. Thorne

(57) ABSTRACT

A method and apparatus to refine object boundaries of computer determined scene objects extracted from stereoscopic images is disclosed. In the method disclosed, a refinement of object boundaries is performed by altering the pixel combinations used to create scene objects. In this method, each pixel in a one image is re-combined with alternative pixels in a second image and a new disparity measure is determined for each of the re-matched pixel combinations. When the new disparity measure remains in dynamically specified boundaries the re-matched pixel combination is retained, thus, replacing a previous matched pixel combination. When the new disparity measure falls outside specified boundaries, a previous re-matched combination is retained. The process of altering pixel combinations by re-matching pixels between the stereoscopic images continues for each pixel of the combined image.

32 Claims, 9 Drawing Sheets

METHOD AND APPARATUS FOR IMPROVING OBJECT BOUNDARIES EXTRACTED FROM STEREOSCOPIC IMAGES

FIELD OF THE INVENTION

The present invention relates to computer-vision technology. More specifically, this invention relates to improving the determination of object boundaries perceived within an image.

BACKGROUND OF THE INVENTION

Computer vision technology is undergoing considerable development to enable a computer to perceive the images of a scene. The ability of computers to recognize and perceive images of a scene or image is important so as to provide an additional means of inputting data into a computer. Hence, a computer may be presented a scene and the images or objects in the scene may be recorded for later enhancement, filtering, coloring, etc. One aspect of computer vision technology is the determination of depth of objects in an image. The determination of depth of objects aids in determining the boundaries of each object. One technique to achieve depth perception is using a stereoscopic technique, i.e., using two cameras to record the image. The concurrently viewed images are then processed to determine the relative positions of the objects in the image. Typically, the determination of matching objects between the images is performed by comparing a group of pixels of known size, e.g., a matrix 9×9 pixels, in one image with a similar group of pixels in a second image. In those cases, when image objects are sufficiently spaced apart, i.e., greater than the matching resolution criteria, the object boundaries are typically clearly denoted. As the objects are positioned closer together or a lack of textural difference between objects exists, the determination of the object boundaries becomes more difficult. Methods of improving the determination of object boundaries are known in the art. For example, methods using point-to-point matching, as disclosed in "*Depth Discontinuities by Pixel-to-Pixel Stereo*," S. Birchfed, C. Tomasi, International Journal of Computer Vision 35(3), p. 1–25, 1999, referred to herein as the *Stanford algorithm*, produces sharp boundaries. However, these methods occasionally fail to determine the boundary position correctly and produce boundaries that are shifted significantly. Hence, there in a need to improve object boundary determination, without increasing the time of processing, in areas where a lack of texture causes blurring of object boundaries.

SUMMARY OF THE INVENTION

A method for refining object boundaries in stereoscopic images of a same scene by reprocessing determined pixel image data to refine boundary images. That is, using convenient processing techniques, two stereoscopic images are processed into a single resultant image, which includes matching corresponding pixels between the two images and determining a measure of disparity difference in position of the same object in the two images. The method then reprocesses the resultant image, by selecting each pixel in the resultant image, one pixel at a time, and determining a re-match such that a corresponding pixel in a first image is re-matched to an different pixel in the second image. A second dissimilarity measure for the re-matched pixel combination is then determined and the re-matched pixel combination is retained while the second dissimilarity measure is not substantially different from the first measure. A second dissimilarity measure is not substantially different from the first measure when the second measure is within known bounds about a determined value.

Figure 1A:
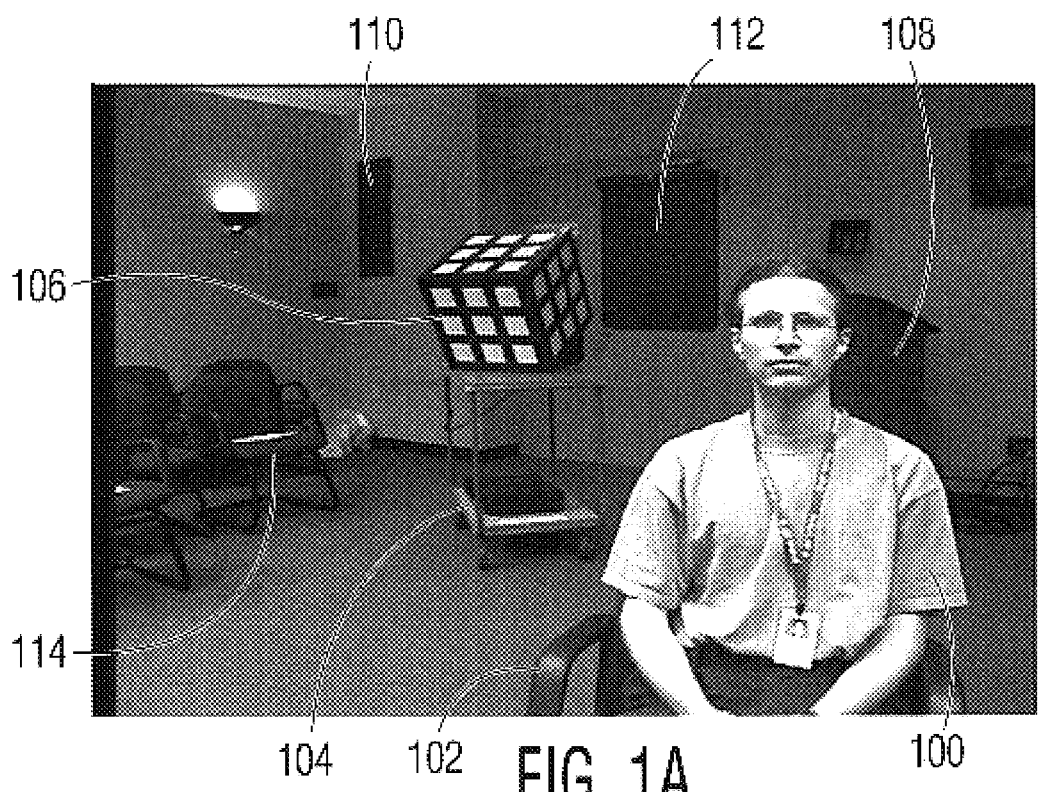
FIGS. 1*a* and 1*b* illustrate two images viewed using a stereoscopic camera system.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

Figure 1B:
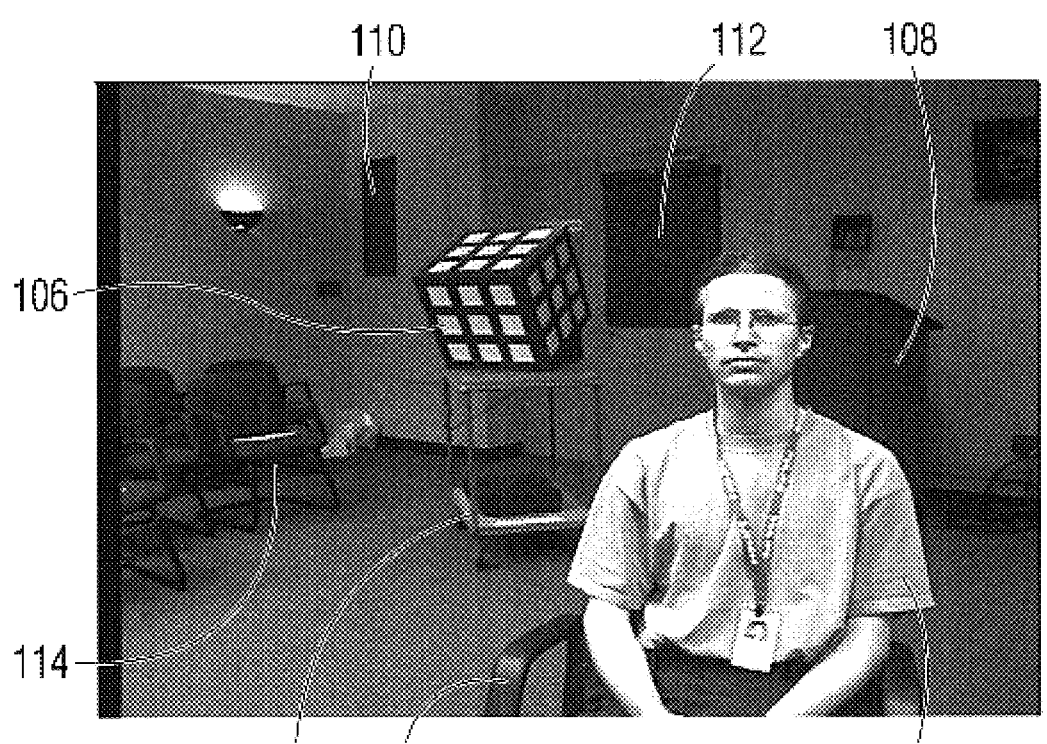
Figure 2:
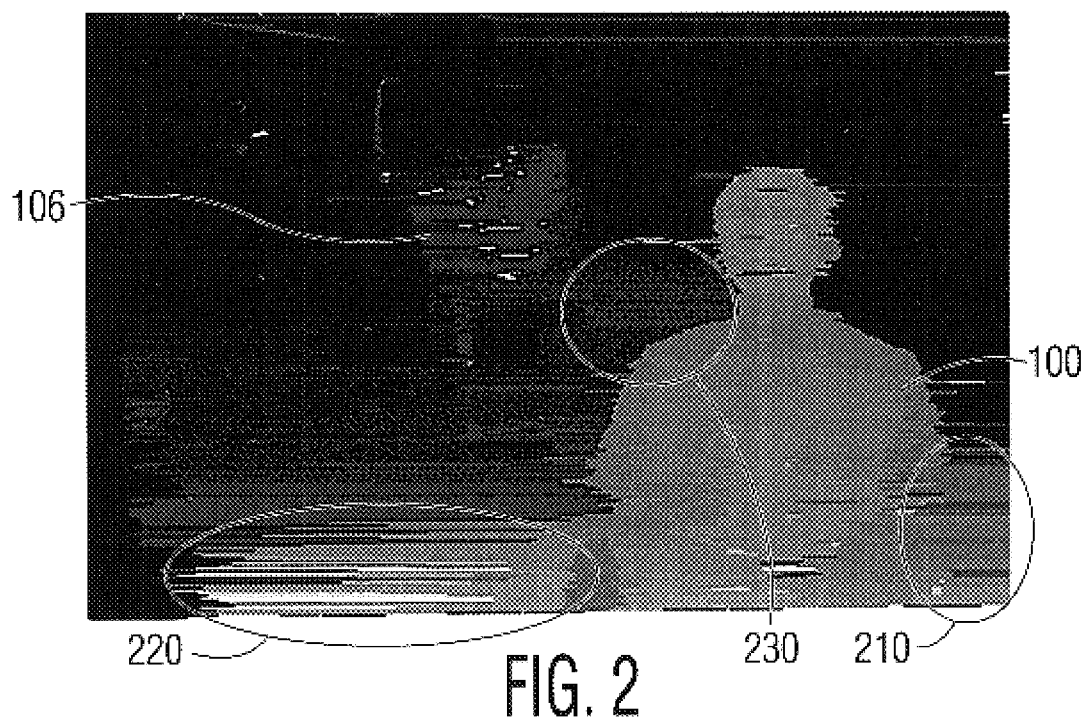
FIG. 2 illustrates a perceived disparity image of the two images illustrated in FIGS. 1*a* and 1*b*.
Figure 3:
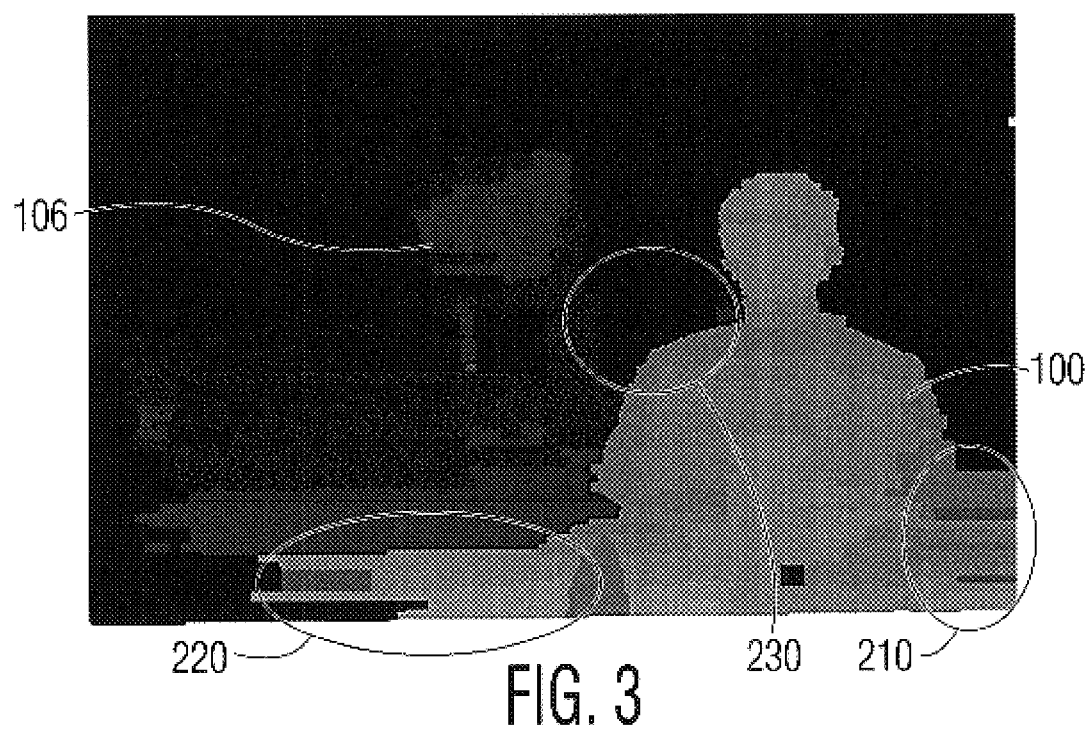
FIG. 3 illustrates one exemplary processing of the perceived computer depicted in FIG. 2.
Figure 4A:
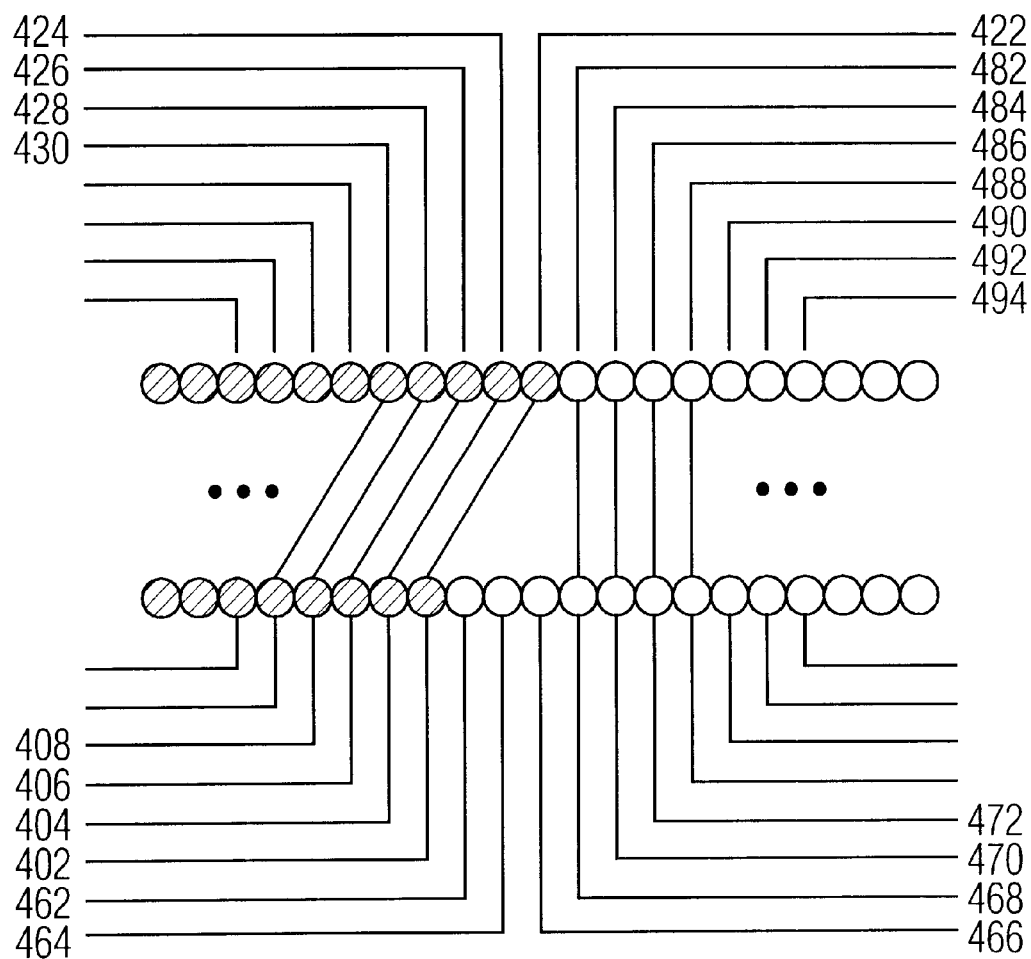
FIG. 4*a* illustrates an exemplary correct matching of pixels between two images.
Figure 5A:
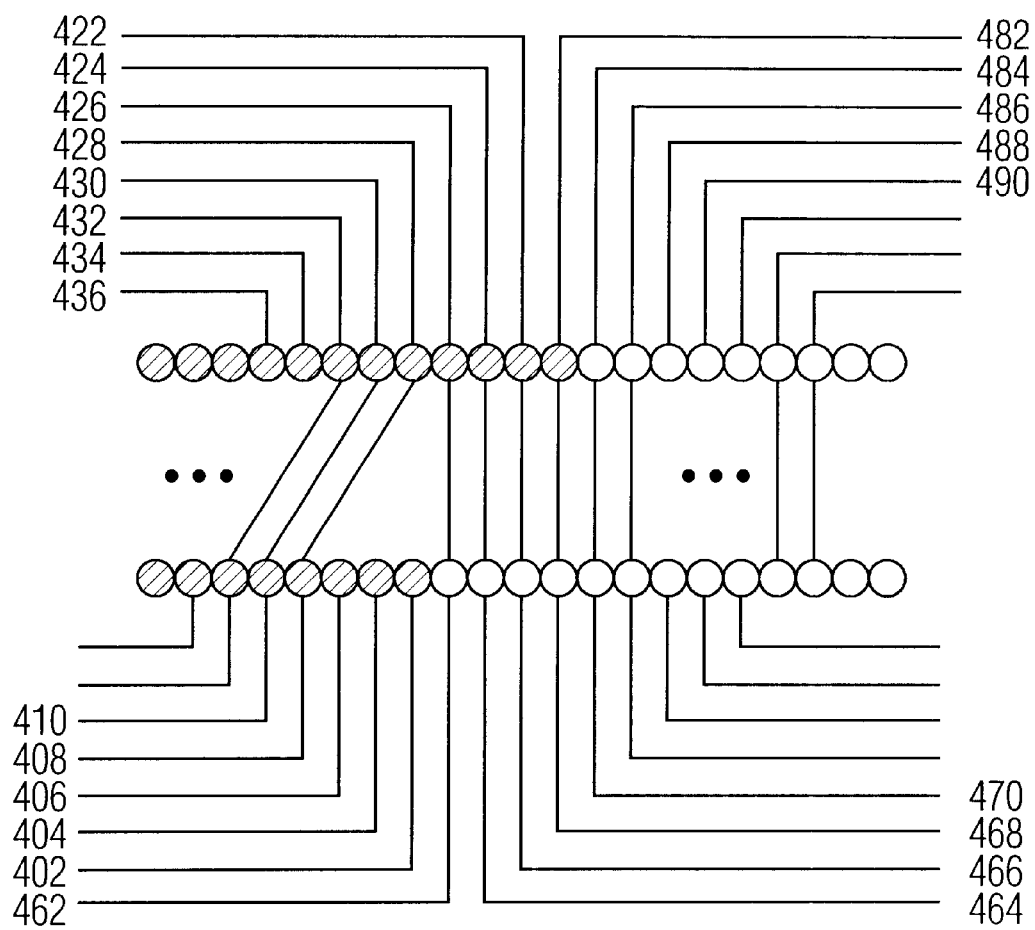
FIG. 5*a* illustrates an exemplary mismatching of pixels between two images.
Figure 5C:
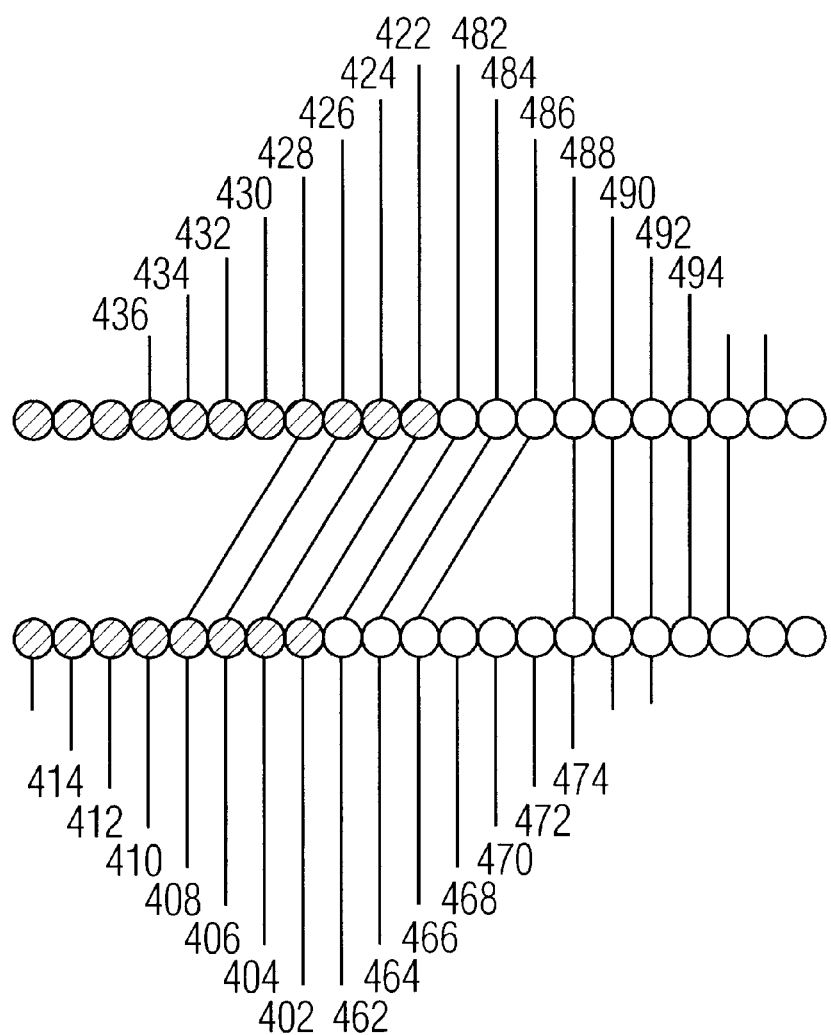
FIG. 5*c* illustrates a second exemplary mismatching of pixel between two images.
Figure 6A:
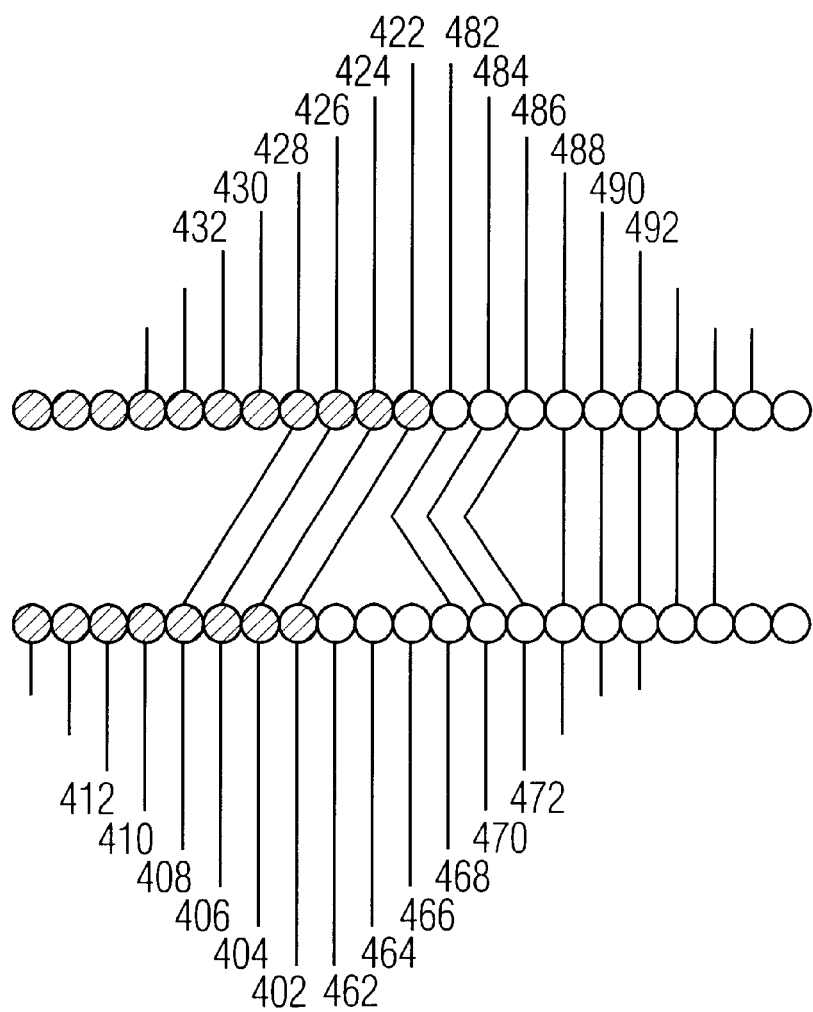
FIG. 6*a* illustrates an exemplary re-matching of pixels between two prospective images in accordance with the principles of the present invention.

To understand and appreciate the novel features of the present invention, which involve correcting pixel mismatches in a computer image representation at object boundaries, it is first necessary to discuss conventional image boundary recognition processes and the problems associated therewith. FIGS. 1*a* and 1*b* are illustrative of conventional stereoscopic images. FIG. 2 is illustrative of a disparity image created by matching pixel elements of the images contained in FIGS. 1*a* and 1*b*. FIG. 3 is illustrative of a first level refinement of object boundaries in accordance with conventional image processing techniques. FIG. 4*a* illustrates an ideal, and desired, image boundary solution. FIGS. 5*a* and 5*c* illustrate exemplary pixel mismatches in object boundaries. FIG. 6a illustrates the pixel mismatch correction in accordance with the principles of the invention. And FIG. 7 illustrates a flow chart of exemplary processing in accordance with the principles of the invention.

FIGS. 1a and 1b illustrate an exemplary scene viewed by a left camera and a right camera, respectively. In this example, both views include objects such as person 100, chair arm 102, cart 104, block 106, stand 108, sign 110, board 112, chair 114, etc. As is known, stereoscopic viewing of a scene creates an apparent shift of the image, i.e., a parallax, between the respective views. The parallax is observable in FIGS. 1a and 1b with regard to the relation of person 100 to stand 108, for example. In FIG. 1a, stand 108 is more fully covered by person 100 than in FIG. 1b. The parallax is also observable with regard to cart 104 and a right shoulder of person 100.

FIG. 2 illustrates a disparity image formed by combining the images in FIGS. 1a and 1b. In this case, the image pixel differences are mapped using a known image processing technique, e.g., the Stanford algorithm. This mapping of the difference in the image pixels, i.e., disparity mapping, defines for each pixel how much it is shifted between the left and right images, i.e., FIGS. 1a and 1b, respectively. In this illustrative example, object person 100 is generally distinguishable from surrounding objects in the scene. However, significant parts of person 100 are indistinguishable and spread into the surrounding areas. This spread is illustrated as areas 210 and 220. As illustrated, block 106 is somewhat distinguishable, but not resolvable, from the surrounding background. Block 106 is not as distinguishable as object person 100 as block 106 is further from the viewing camera and closer to the background wall. Further still, cart 104 is spread into the background image, as illustrated in area 230. This inability to uniquely resolve objects from the surrounding background is caused in part by errors introduced at the object boundaries by the lack of texture in some parts of the image.

FIG. 3 illustrates an exemplary image using known methods of image processing. In this example, area 230 is corrected by the post-processing steps of a Stanford algorithm. However, the processing does not distinguish the image spread illustrated in areas 210 and 220.

FIG. 4a illustrates a correct solution for matching pixels from a left image, e.g., FIG. 1a, and a right image, e.g. FIG. 1b. In this case, darken circles 402, 404, 406, etc., are representative of pixels of a first object, e.g., person 100, in a right image, for example, and darken circles 422, 424, 426, etc., are representative of pixels of the first object in a left image. Similarly, lighten circles 462, 464, 466, etc., are representative of pixels of a second object, e.g., cart 104, in a right image and lighten circles 482, 484, 486, etc. are representative of pixels of the same second object in a left image. As would be appreciated, pixels 422, 424 and 424 are shifted with regard to pixels 402, 404 and 406, etc. because of the parallax shift between the images.

Accordingly, a correct match of pixels between left and right images is obtained when right image object pixels 402, 404, 406 etc. are matched with left image object pixels 422, 424, 426, etc. Similarly, right second object pixels 468, 470, 472, etc., are matched with left image second object pixels 482, 484, 486, etc. As illustrated, second object pixels 462, 466, and 468, are not matched because they are not seen in both images, i.e., a parallax effect. Hence, these pixels are correctly removed from the processed image.

Figure 4B:
FIG. 4*b* illustrates an exemplary dissimilarity measure of the pixels illustrated in FIG. 4*a* correctly matched.

FIG. 4b illustrates an exemplary measure, i.e., a cost function, associated with the pixel-by-pixel match. The determination of cost functions is well known in the art and may be obtained using the Stanford algorithm referred to previously.

FIGS. 5a and 5c illustrate two conditions of mismatching object pixels. In FIG. 5a, pixel mismatch causes pixels from a first object in a left image, for example, to be matched to pixels of a second object in right image. In FIG. 5c, pixel mismatch causes pixels that are seen in both images to be incorrectly matched. In this illustrative example, pixels 468, 470, 472, which should be matched to pixels 482, 484 and 486, are not matched correctly. Hence, pixels 482, 484, 486 are incorrectly removed from processed image and pixels 462, 464, 466 are incorrectly included.

Figure 5B:
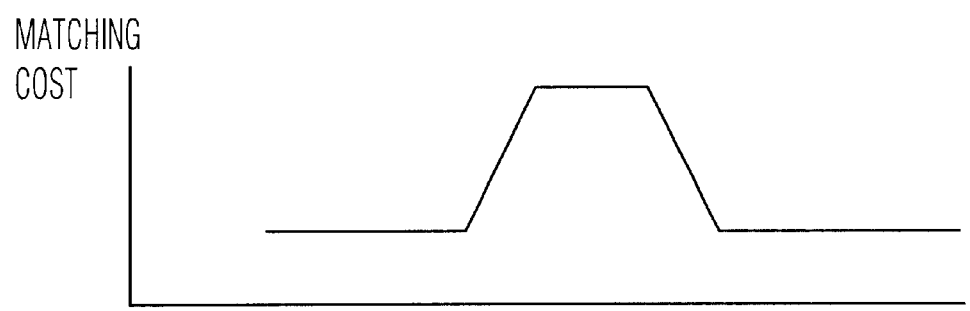
FIG. 5*b* illustrates an exemplary measure of pixels illustrated in FIG. 5*a* that are mismatched.
Figure 5D:
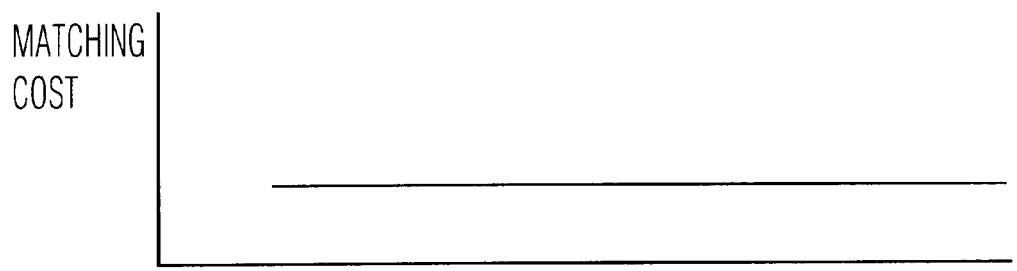
FIG. 5*d* illustrates an exemplary measure of pixels illustrated in FIG. 5*c* that are mismatched.

FIG. 5b illustrates the effect on a cost function for the pixel mismatch illustrated in FIG. 5a. As illustrated, a significant increase in the cost function is measured in the area of the mismatch. This type of error occurs infrequently using the convention methods of boundary determination. FIG. 5d illustrates the effect on a cost function for the pixel mismatch illustrated in FIG. 5c. In this case, there is little or no effect on the cost function as pixels from the correct objects are matched. However, pixels are incorrectly matched and those pixels that should be matched and retained are actually discarded. Thus, while the cost function is not adversely effected the object boundary is shifted.

Figure 6B:
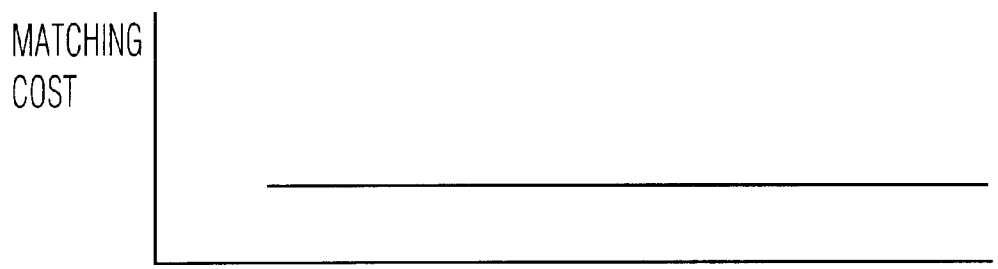
FIG. 6*b* illustrates an exemplary measure of pixels illustrated in FIG. 6*a* that are re-matched in accordance with the principles of the invention.

FIG. 6a illustrates a correction of pixel mismatching in accordance with the principals of the invention, using the example illustrated in FIG. 5c. In this illustrative example, after a pixel matching solution has been obtained, using for example a minimum cost function solution, each of the pixels are re-matched to determine a potentially better solution. The effect on the cost function is then determined and if the effect on the revised cost function is not significantly adverse then the re-matched pixel combination is retained. This process continues until an adverse impact on the cost function is determined. For example, as illustrated pixels 462, 464 and 468 are incorrectly matched to pixels 482, 484 and 486. Illustrated also are indicators 610, 612 and 614, which are representative of the linkages that are necessary to obtain correctly matched pixels. That is, pixel 486, which is mismatched to pixel 466, would be correctly matched when it is matched to pixel 472. In accordance with the principles of the invention, pixel 486 would be re-matched to pixel 472. In each re-match a new dissimilarity measure is obtained and compared to determined bounds. When there is an significantly adverse effect on a disparity measure, the process of re-match a selected pixel is completed. Similarly, pixel 484 would be correctly matched when it is matched to pixel 470 and pixel 482 would be correctly matched when it is matched to pixel 468. FIG. 6b illustrates that there is no adverse effect on a cost function when the pixels are re-matched. No adverse effect on a cost function is observable, as these re-matched pixels are also valid combinations of pixels.

Figure 7A:
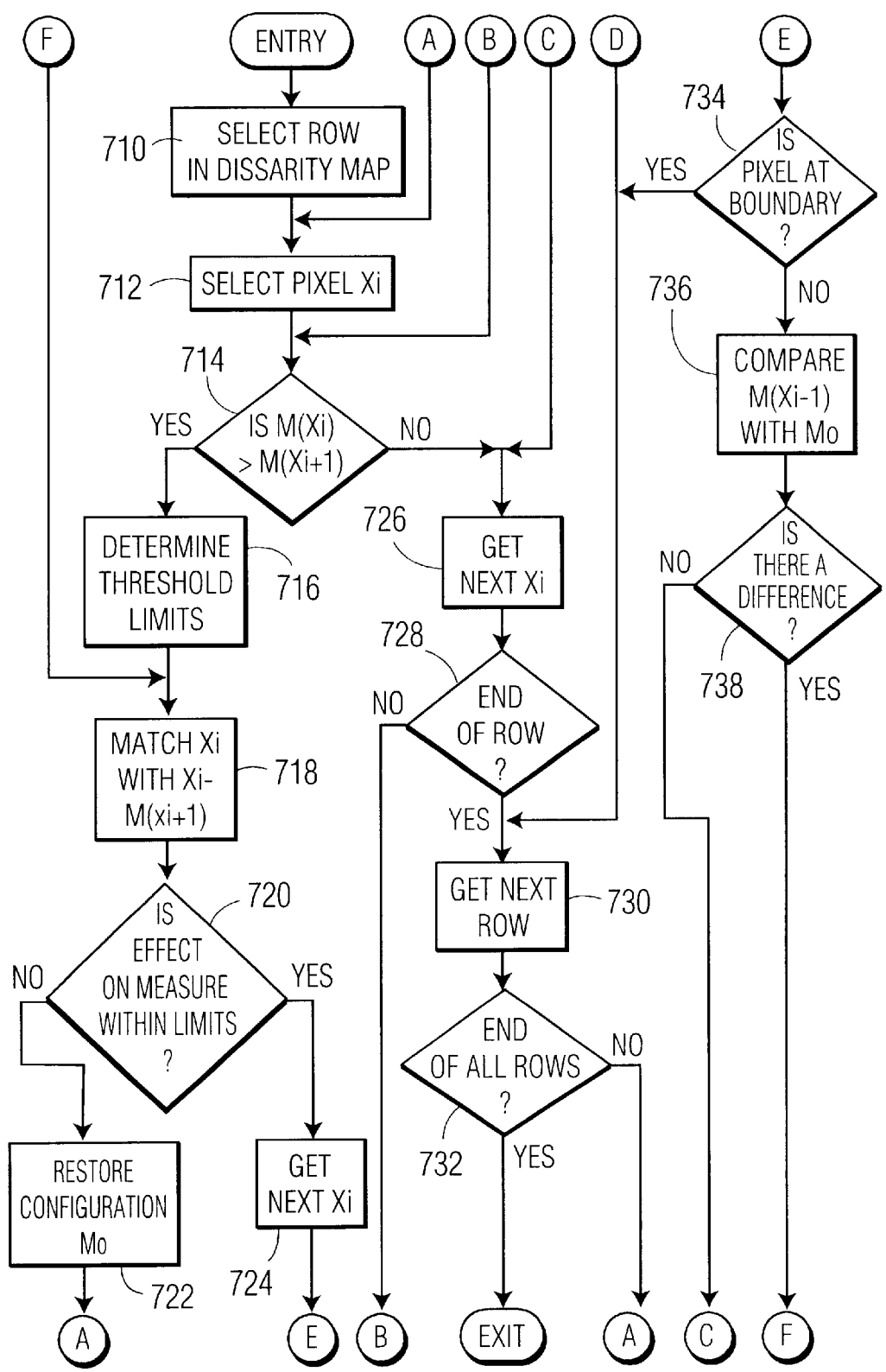
FIG. 7*a* illustrates a flow chart depicting exemplary processing in accordance with the principles of the present invention.

FIG. 7a illustrates a flow chart of an exemplary processing in accordance with the principles of the invention. After the two images are matched and a disparity image, or map, as illustrated in FIG. 2, is created, a row in the disparity map is selected, at block 710. At block 712, a pixel in the selected row of the disparity image, denoted as Xi, is then selected. At block 714, a determination is made as to whether the disparity measure of pixel Xi is greater than the disparity measure of an adjacent pixel, such as $X_{i+1}$.

If the determination at block 714 is in the affirmative, then threshold limits are determined at block 716. At block 718, a tentative re-match of pixel $X_i$ with pixel $(X_i-M(X_i+1))$ is made, where $M(X_{i+1})$ is a disparity measure. A new dissimilarity measure is then determined for the re-matched pixel. At block 720 a determination is made whether the dissimilarity measure of the tentative re-matched pixel is within determined tolerance bounds. If the determination is in the affirmative then a new pixel $X_{i-1}$ is selected, at block 724.

A determination as to whether the next pixel selected is at the image boundary. If the answer is in the affirmative, then the next row is selected at block 730. If the determination is in the negative, then the disparity of the selected pixel is compared to the original configuration, i.e., $M(X_i)$ referred to as $M_o$. If a difference in the disparity measure of the selected pixel is determined, then the selected pixels are considered matched, at block 718. Otherwise, the next pixel is selected at block 726.

If the determination, at block 720, is in the negative then the previous $X_{i1}$, $X_{j2}$ combination is retained. The next pixel, X is then selected at block 712.

If the determination, at block 714, is found to be in the negative, then the next pixel, X, in the selected row is selected. A determination is made, at block 728, as to whether the last pixel in the selected row has been processed. If the determination is in the negative, then the selected pixel, X, is processed beginning at block 714. If, on the other hand, the determination is in the affirmative, then the next row is selected, at block 730. A determination is then made, at block 732, as to whether the all the rows in the disparity map have been processed. If the determination is in the negative, then a pixel, X, in the selected row is processed beginning at block 712.

If the determination, at block 732, is in the affirmative, then the processing is ended.

Figure 7B:
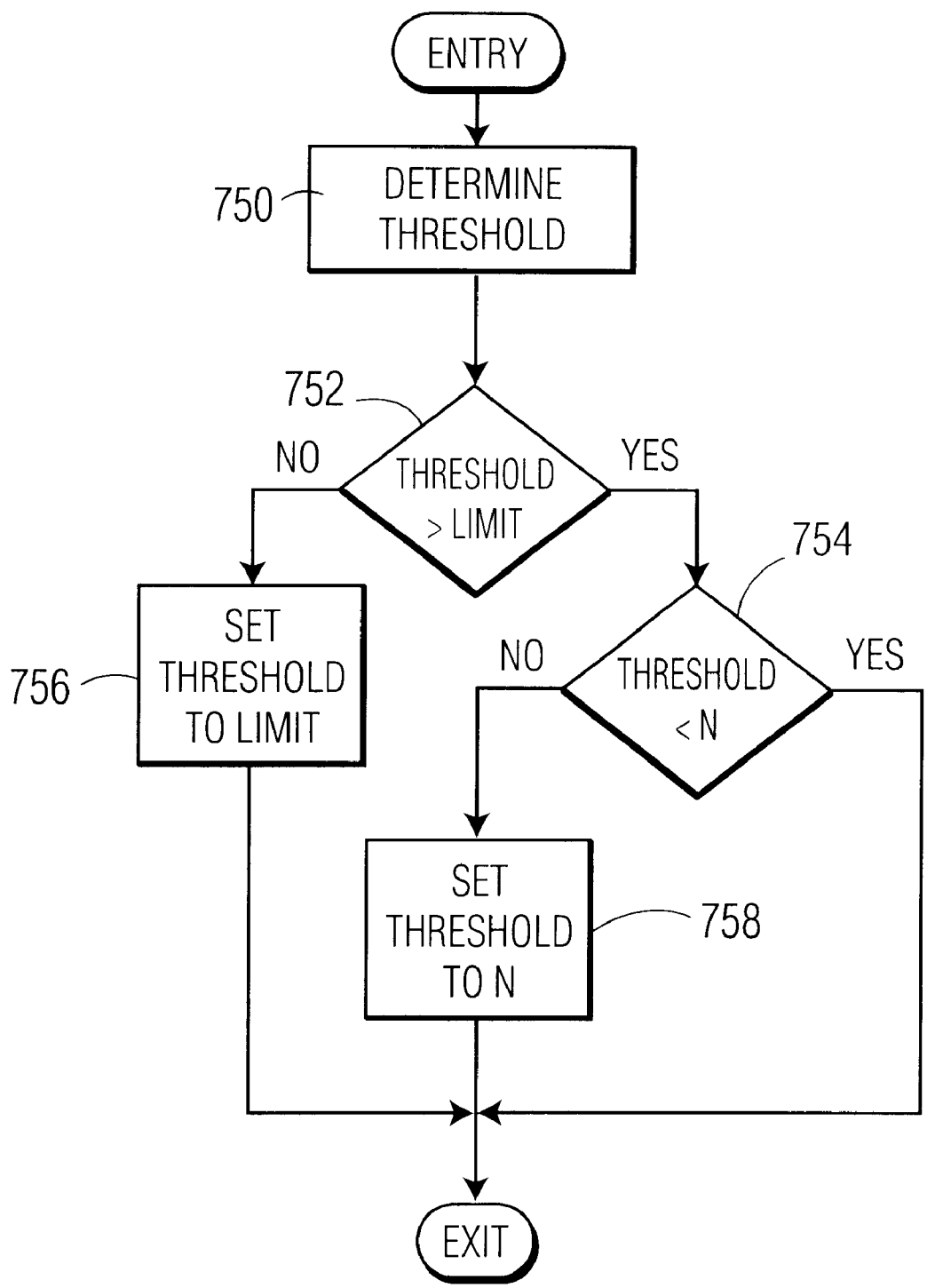
FIG. 7*b* illustrates a second flow chart depicting exemplary processing in accordance with the principles of the present invention.

FIG. 7b illustrates an exemplary processing in establishing threshold value limits used to determine the whether a pixel re-matching may be validated. In this illustrative processing, at block 750, a tentative threshold value is determined as an average value of the disparity map values of a plurality of pixels adjacent to selected pixel, X, augmented by a known value. At block 753, a determination is made as to whether the tentative threshold value is above a second known value. If the determination is in the negative, then a threshold value is set as the second known value. On the other hand, if the determination is in the affirmative, then a determination as to whether the tentative threshold value is below a third known value is made at block 754. If the determination is in the negative then the threshold value is set to this third known value, at block 758. Otherwise, if the determination is in the affirmative, then the threshold value is set as the tentative threshold value. In a preferred embodiment of the invention, a tentative threshold value is determined as the average of the disparity values of at least three pixels adjacent to the selected pixel, e.g., $X_{I+1}$, $X_{I+2}$, $X_{I+3}$, augmented by ten (10) units. Further, threshold values are limited to be fifteen (15) and fifty (50) units, i.e., second known value is 15 and third known value is 50. In another aspect of the invention, the referred to known values may be determined as a percentage of the average of the disparity values of a plurality of adjacent pixels. Furthermore, each of the referred to known values may be selected as a fixed value or a percentage of an average of the disparity values of a plurality of adjacent pixels. As would be appreciated, each referred to known value may be significantly amended without altering the principles and spirit of the invention.

Figure 8:
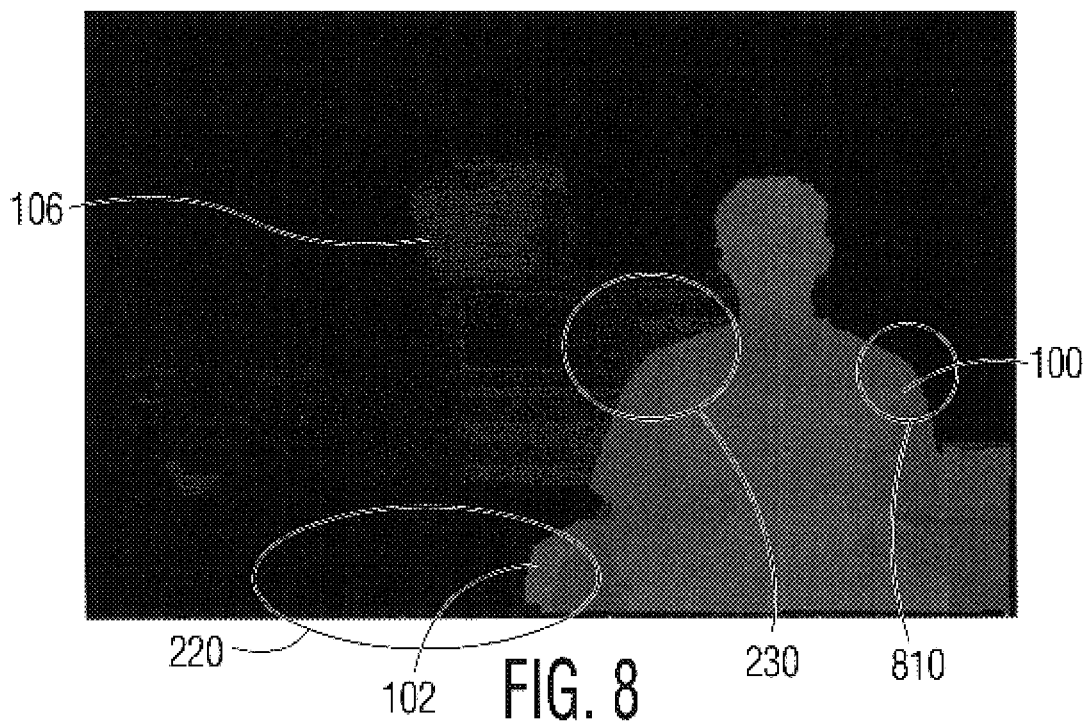
FIG. 8 illustrates an exemplary computer image of FIG. 2 processed in accordance with the principles of the present invention.

FIG. 8 depicts the exemplary computer image depicted in FIG. 3 reprocessed in accordance with the principles of the invention. In this illustrative example, block 106 is clearly distinguished, and area 210 distinguishes chair arm 102 and person 100 from the background.

The method disclosed in FIGS. 7a and 7b is representative of a process to correct object boundaries when a foreground object is to the left of the boundary and possibly overruns to the right of the image. As would be appreciated, an identical and symmetric process for correcting boundaries when a foreground object is to the right of a boundary may also be implemented. The identical process may be obtained from the process illustrated in FIGS. 7a and 7b by exchanging left and right images and the direction of processing pixels in each row. Hence, in one embodiment, matched pixel entities are selected beginning, for example, at a left most pixel entity and pixel entities are selected subsequent to a selected entity. In an identical, symmetric process, matched pixel entities are selected beginning, at a right most pixel entity and pixel entities are selected as preceding a selected entity. Using the two processes, i.e., the one illustrated in FIGS. 7a and 7b, and the identical, symmetric, process, the object boundaries may be more clearly defined, as illustrated in regions denoted as 210 and 810 in FIG. 8.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is expressly intended that all combinations of those elements and/or method steps which perform substantially the same function in substantially the same way to achieve the same results are within the scope of the invention. Substitutions of elements from one described embodiment to another are also fully intended and contemplated.

What is claimed is:

1. A method for refining object boundaries using a first stereoscopic image of a scene and a second stereoscopic image of the scene, wherein corresponding pixels between said stereoscopic images are each matched as a single pixel entity having a first disparity measure, said method comprising the steps of:

a. selecting one of said matched pixel entities;

b. matching a corresponding pixel in said first image to an adjacent pixel in said second image to generate a re-matched pixel entity;

c. determining a second measure for said re-matched pixel entity;

d. retaining said re-matched pixel entity when said determined second measure is not substantially different from said first measure.

e. repeating steps b through d for each pixel entity.

2. The method as recited in claim 1 wherein steps a through e are repeated for each of said matched pixel entity.

3. The method as recited in claim 1 wherein said first measure and said second measure comprises a cost function.

4. The method as recited in claim 1 wherein said second measure is not substantially different when said second measure lies within a known range about a determined value.

5. The method as recited in claim 4 wherein said determined value is an average disparity value of a plurality of adjacent matched pixel entity disparity values augmented by a first known value.

6. The method as recited in claim 4 wherein said determined value is an average disparity value of the disparity values of three adjacent pixels augmented by a first known value.

7. The method as recited in claim 6 wherein said first known value is ten units.

8. The method as recited in claim 4 wherein said known range is determined as a percentage of said determined value.

9. The method as recited in claim 4 wherein said known range includes a known lower limit value.

10. The method as recited in claim 9 wherein said known lower limit value is 15 units.

11. The method as recited in claim 4 wherein said known range included a known upper limit value.

12. The method as recited in claim 11 wherein said known upper limit value is 50 units.

13. The method as recited in claim 1 wherein said selected one matched pixel entity is selected starting at a first pixel entity in a row.

14. The method as recited in claim 13 wherein said adjacent pixels are selected as at least one subsequent pixel entity in said row.

15. The method as recited in claim 1 wherein said selected one matched pixel entity is selected starting at a last pixel entity in said row.

16. The method as recited in claim 15 wherein said adjacent pixels are selected as at least one preceding pixel entity in said row.

17. An apparatus for refining object boundaries using a first stereoscopic image of a scene and a second stereoscopic image of the scene, wherein corresponding pixels between said stereoscopic images are each matched as a single pixel entity having a first disparity measure, said apparatus including a selector to select a single one of said matched pixel entities in a selected row;

a matcher to match a corresponding pixel in said first image to an adjacent pixel in said second image to generate a re-matched pixel entity;

a disparity measure device to determine a second measure for said re-matched pixel entity;

a difference device to determine a difference between said second measure and said first measure;

a retaining device to retain said re-matched pixel entry when said difference is not substantial.

18. The apparatus as recited in claim 17 is further operative to process each of said matched pixel entities.

19. The apparatus as recited in claim 17 wherein said disparity measure device determines said first measure and said second measure as a cost function.

20. The apparatus as recited in claim 17 wherein said retaining device is operative to determine said difference is not substantially different when said second measure lies within a known range about a determined value.

21. The apparatus as recited in claim 20 wherein said retaining device is operative to determine said known range as an average of a plurality of adjacent matched pixel entities disparity values augmented by a first known value.

22. The apparatus as recited in claim 20 wherein said retaining is operative to determine said known range as an average of three adjacent pixel entities disparity values augmented by a first known value.

23. The apparatus as recited in claim 22 wherein said first known value is ten units.

24. The apparatus as recited in claim 20 wherein said retaining device is operative to determine said known range as a percentage of said determined value.

25. The apparatus as recited in claim 20 wherein said known range includes a known lower limit value.

26. The apparatus as recited in claim 25 wherein said known lower limit value is 15 units.

27. The apparatus as recited in claim 20 wherein said known range included a known upper limit value.

28. The apparatus as recited in claim 27 wherein said known upper limit value is 50 units.

29. The apparatus as recited in claim 17 wherein said selector is operative to select said matched pixel entity starting at a first pixel entity in said row.

30. The apparatus as recited in claim 29 wherein said plurality of adjacent pixel entities are selected subsequent to said selected pixel entity.

31. The apparatus as recited in claim 17 wherein said selector is operative to select said matched pixel entity starting at a last pixel entity in said row.

32. The apparatus as recited in claim 31 wherein said plurality of adjacent pixel entities are selected preceding said selected pixel entity.

* * * * *